Patented Dec. 1, 1925.

1,563,748

UNITED STATES PATENT OFFICE.

CHAD H. HUMPHRIES, OF KOKOMO, INDIANA, ASSIGNOR TO METALS PROTECTION CORP., OF KOKOMO, INDIANA, A CORPORATION OF INDIANA.

WELDING.

No Drawing.  Application filed August 31, 1925.  Serial No. 53,766.

*To all whom it may concern:*

Be it known that I, CHAD H. HUMPHRIES, a citizen of the United States, residing at Kokomo, in the county of Howard and State of Indiana, have invented certain new and useful Improvements in Welding, of which the following is a specification.

This invention is designed to overcome the difficulty known as "sputtering" which is frequently encountered in the electric and acetylene or gas welding of iron and steel articles. Sputtering is a rather serious problem since it not only detracts from the appearance but also from the strength of the weld. While the exact cause of sputtering is not known, it has been observed that it is more pronounced in the case of gas welding than in the case of electric welding and also that it occurs more frequently with certain grades of steel than with other grades. My observations have led me to believe that sputtering is due largely to a surface condition of the metal.

The invention consists in treating the metal surfaces to be welded with a strong solution of chromic acid for instance by dipping or local application. A suitable chromic acid solution for this purpose may have for example the following composition: Technical chromic acid, 2 pounds; sulfuric acid, ½ ounce; water, 1 gallon.

The effect of the chromic acid solution, except that it forms a firmly adherent brownish-yellow film on the surfaces of the metal to which it is applied and facilitates the welding and eliminates the tendency to sputter of metals which previous to the treatment were difficult to weld due to sputtering, is not definitely known. There is no doubt some chemical action between the metal and the chromic acid solution and it seems probable that the action of the solution is to clean the metal surface of organic matter and to deposit over the surface of the clean metal a coating of ferroso-ferric chromate.

In practice the chromic acid solution is applied to the surfaces of the metal to be welded either by dipping or by local application with a brush or the like and is allowed to dry or partially dry which occurs quickly and is then welded by means of an acetylene or gas torch or by means of an electric welding rod in the usual way.

I claim:

1. In a process for welding surfaces of iron or steel articles, the step comprising the exposure of such surfaces to the action of a chromic acid solution.

2. A process for the welding of surfaces of iron or steel articles, which comprises acting upon such surfaces with a solution having substantially the following composition: technical chromic acid 2 pounds, sulfuric acid ½ ounce and water 1 gallon.

3. In a process for welding iron or steel surfaces, the step which comprises forming a thin coating or film of ferroso-ferric chromate on such surfaces.

4. Process for gas and electric welding of iron and steel articles which consists in applying to the surfaces to be welded a solution of chromic acid, allowing the surfaces to dry, and welding the surfaces.

In testimony whereof, I affix my signature.

CHAD H. HUMPHRIES.